(12) United States Patent
Vanni et al.

(10) Patent No.: US 9,422,104 B2
(45) Date of Patent: Aug. 23, 2016

(54) CARTRIDGE FOR PREPARING A LIQUID PRODUCT

(75) Inventors: Alfredo Vanni, Turin (IT); Alberto Cabilli, Turin (IT)

(73) Assignee: LUIGI LAVAZZA S.P.A., Turin (IT)

( * ) Notice: Subject to any disclaimer, the term of this patent is extended or adjusted under 35 U.S.C. 154(b) by 212 days.

(21) Appl. No.: 13/992,183

(22) PCT Filed: Dec. 7, 2011

(86) PCT No.: PCT/IB2011/055518
§ 371 (c)(1),
(2), (4) Date: Jun. 6, 2013

(87) PCT Pub. No.: WO2012/080908
PCT Pub. Date: Jun. 21, 2012

(65) Prior Publication Data
US 2013/0255504 A1    Oct. 3, 2013

(30) Foreign Application Priority Data

Dec. 14, 2010 (IT) .............................. TO2010A0995

(51) Int. Cl.
*A47G 19/14*    (2006.01)
*B65B 29/02*    (2006.01)
(Continued)

(52) U.S. Cl.
CPC .......... *B65D 85/8043* (2013.01); *B65D 65/466* (2013.01); *B65D 85/8046* (2013.01); *A47G 19/16* (2013.01); *Y02W 90/13* (2015.05); *Y02W 90/14* (2015.05)

(58) Field of Classification Search
CPC ....... A47J 31/005; A47J 31/52; A47J 31/047; A47J 31/56; A47J 31/3614; A47J 31/007; A47J 31/0573; A47J 31/057; A47J 31/22; A47J 31/02; B65D 85/8043; B65D 85/812; B65D 85/808; B65D 81/32; B65D 65/46; B65D 33/01; B65D 29/00; A47G 19/16; B23B 1/02; Y10T 428/1303; Y10T 428/1307; Y10T 428/1324; Y10T 428/1352; Y10T 428/1362; A23F 5/14; A23B 4/16; C04B 37/005

USPC ....... 99/279, 280, 281, 282, 283, 289 R, 291, 99/294, 295, 300, 302 C, 309 P, 304, 306, 99/323, 299; 426/77–84, 115, 394; 156/325; 383/1, 102, 107
See application file for complete search history.

(56) References Cited

U.S. PATENT DOCUMENTS 3,175,533 A * 3/1965 Frydryk ........................ 118/202
3,196,065 A * 7/1965 Liszewski et al. ............ 156/291
(Continued)

FOREIGN PATENT DOCUMENTS

CH          406 561        8/1966
EP          0 199 953     12/1986
(Continued)

OTHER PUBLICATIONS

EP 2223869 A1 Machine Translation, Wons, Uwe, Machine Readable, Fully Biodegradable Portion Pad for the Preparation of Drinks, Sep. 1, 2010.*

(Continued)

*Primary Examiner* — Dana Ross
*Assistant Examiner* — Hemant Mathew
(74) *Attorney, Agent, or Firm* — Nixon & Vanderhye P.C.

(57) ABSTRACT

A cartridge (10) for preparing a liquid product, for example a beverage such as coffee by introducing liquid and/or steam into the cartridge (10) contains a dose (12) of at least one substance, such as for example powdered coffee, which is able to form the aforesaid product using said liquid and/or steam. The dose is enclosed between foils (14, 16) that can be traversed by the aforesaid liquid and/or steam, said foils (14, 16) being connected together around the dose (12). The aforesaid foils (14, 16) are made of compostable material, i.e., a material that can be recovered by composting and biodegradation, and are connected together around the dose (12) using a connecting material (30), which is also compostable. The cartridge as a whole can hence be recovered by composting and biodegradation, in compliance with the European Norm UNI EN 13432:2002 and/or subsequent modifications and integrations thereof.

8 Claims, 3 Drawing Sheets

(51) Int. Cl.
  *B65D 85/804* (2006.01)
  *B65D 65/46* (2006.01)
  *A47G 19/16* (2006.01)

(56) References Cited

U.S. PATENT DOCUMENTS

| | | | |
|---|---|---|---|
| 3,292,527 A | | 12/1966 | Stasse |
| 3,403,617 A | | 10/1968 | Lampe |
| 3,470,812 A | | 10/1969 | Levinson |
| 3,607,297 A | | 9/1971 | Fasano |
| 4,136,202 A | | 1/1979 | Favre |
| 4,776,455 A | * | 10/1988 | Anderson ............ C11D 17/046 206/0.5 |
| 4,932,155 A | * | 6/1990 | Friemel ................. A01N 25/18 428/198 |
| 5,398,596 A | | 3/1995 | Fond |
| 5,851,937 A | | 12/1998 | Wu et al. |
| 6,365,680 B1 | | 4/2002 | Edgington et al. |
| 2002/0001686 A1 | * | 1/2002 | Kashiba ................. B32B 27/08 428/35.7 |
| 2003/0059500 A1 | * | 3/2003 | Bailey ................. B65D 85/812 426/77 |
| 2004/0115310 A1 | | 6/2004 | Yoakim et al. |
| 2007/0144357 A1 | * | 6/2007 | Rivera ............................ 99/295 |
| 2007/0259139 A1 | * | 11/2007 | Furneaux ..................... 428/34.3 |
| 2010/0196545 A1 | | 8/2010 | Buffet et al. |
| 2010/0313766 A1 | | 12/2010 | Suggi Liverani et al. |
| 2011/0303095 A1 | * | 12/2011 | Fu ............................ A47J 31/08 99/317 |
| 2011/0305801 A1 | * | 12/2011 | Beer ................. B65D 85/8043 426/77 |
| 2012/0058226 A1 | * | 3/2012 | Winkler ............. A47J 31/3695 426/79 |

FOREIGN PATENT DOCUMENTS

| | | | | |
|---|---|---|---|---|
| EP | 0 211 511 | | 2/1987 | |
| EP | 0 242 556 | | 10/1987 | |
| EP | 0 468 078 A1 | | 1/1992 | |
| EP | 0 469 162 A1 | | 2/1992 | |
| EP | 0 561 982 B1 | | 3/1995 | |
| EP | 0 497 838 B1 | | 4/1995 | |
| EP | 0 788 733 B1 | | 10/1999 | |
| EP | 0 723 572 B1 | | 12/1999 | |
| EP | 0 868 275 B1 | | 2/2000 | |
| EP | 0 971 818 B1 | | 5/2005 | |
| EP | 2 218 652 | | 8/2010 | |
| EP | 2 218 653 | | 8/2010 | |
| EP | 2 223 869 | | 9/2010 | |
| EP | 2 223 869 A1 | | 9/2010 | |
| EP | 2223869 A1 | * | 9/2010 | ........... B65D 85/804 |
| EP | 1 842 944 B9 | | 2/2012 | |
| FR | 757.358 | | 12/1933 | |
| FR | 1.537.031 | | 8/1968 | |
| FR | 2 373 999 | | 7/1978 | |
| FR | 2 556 323 | | 6/1985 | |
| FR | 2 917 722 | | 12/2008 | |
| GB | 938617 | | 10/1963 | |
| GB | 2 023 086 A | | 12/1979 | |
| WO | WO86/02537 | | 5/1986 | |
| WO | WO 92/07775 | | 5/1992 | |
| WO | WO 95/10577 | | 4/1995 | |
| WO | WO 9510577 A1 | * | 4/1995 | ............ C09J 167/04 |
| WO | WO 98/43810 | | 10/1998 | |
| WO | WO 2005/030482 A1 | | 4/2005 | |
| WO | WO 2009/053811 | | 4/2009 | |
| WO | WO 2009/053811 A2 | | 4/2009 | |
| WO | WO 2009053811 A2 | * | 4/2009 | .............. A47J 31/10 |

OTHER PUBLICATIONS

International Search Report for PCT/IB2011/055518 mailed Feb. 22, 2012.

Written Opinion of the International Searching Authority mailed Feb. 22, 2012.

Russian Office Action dated Jul. 1, 2015 for Application No. 2013132209/12(048144) (with translation).

* cited by examiner

CARTRIDGE FOR PREPARING A LIQUID PRODUCT

This application is the U.S. national phase of International Application No. PCT/IB2011/055518 filed 7 Dec. 2011 which designated the U.S. and claims priority to IT TO2010A000995 filed 14 Dec. 2010, the entire contents of each of which are hereby incorporated by reference.

TECHNICAL FIELD

The present description relates to cartridges for preparing liquid products.

In various embodiments, the description may refer to cartridges for preparing beverages, such as, for example, coffee.

TECHNOLOGICAL BACKGROUND

Cartridges for preparing a liquid product, such as, for example, a beverage, by introducing into the cartridge liquid (possibly under pressure and/or at high temperature) and/or steam constitute a technological sector that is extremely rich and articulated, as documented, for example, by FR-A-757 358, FR-A-2 373 999 (to which U.S. Pat. No. 4,136,202 corresponds), FR-A-2 556 323, GB-A-938 617, GB-A-2 023 086, CH-A-406 561, U.S. Pat. No. 3,403,617, U.S. Pat. No. 3,470,812, U.S. Pat. No. 3,607,297 (to which FR-A-1 537 031 corresponds), WO-A-86/02 537, EP-A-0 199 953, EP-A-0 211 511, EP-A-0 242 556, EP-A-0 468 078, EP-A-0 469 162 and EP-A-0 507 905.

A fair part of the solutions described in the documents referred to above primarily regards the preparation of liquid products constituted by beverages such as coffee, tea, chocolate, broth, soups, or various infusions. As regards the preparation of coffee, known (for example from EP-A-0 507 905, already mentioned previously) are solutions designed to enable the preparation of espresso coffee.

In particular, known in the production of the present applicant are cartridges sold under the trade name Espresso Family, taken as model for the preamble of Claim 1. These are cartridges containing a dose of at least one substance (for example, powdered coffee) enclosed between two foils that can be traversed by liquid and/or steam with the two foils connected together around the aforesaid dose.

OBJECT AND SUMMARY

In the solution recalled above, the foils in question are connected together via heat sealing. In order to enable said modality of connection, the foils in question are constituted by cellulose paper with the addition a random deposition of fibres of a thermo-fusible material, such as for example polyethylene. The presence of said material is such that the foils that enclose the dose, and hence the cartridge as a whole, cannot be considered "compostable".

The characteristics that a material must possess so that it can be defined as "compostable", according to a definition commonly adopted also at a patent level (see, for example, EP-B-0 497 838, EP-B-0 561 982, EP-B-0 788 733, EP-B-0 723 572, EP-B-0 868 275, EP-B-0 971 818, and EP-B-1 842 944), are currently established by the European Norm EN 13432 "Requirements for packaging recoverable through composting and biodegradation—Test scheme and evaluation criteria for the final acceptance of packaging", recently adopted also in Italy as UNI EN 13432. According to said norm, the characteristics that a compostable material must present are the following:

Biodegradability, i.e., the metabolic conversion of the compostable material into carbon dioxide. This property is measured with a standard testing method, namely prEN 14046 (also published as ISO 14855: biodegradability under controlled composting conditions). The level of acceptance is 90% biodegradability (with respect to cellulose) to be achieved in less than 6 months.

Disintegrability, i.e., the fragmentation and loss of visibility in the final compost (absence of visual contamination). Measured with a composting test on a pilot scale (prEN 14045). Samples of the test material are composted together with organic waste for 3 months. At the end, the compost is sifted with a 2-mm sieve. The mass of residue of the test material with a size greater than 2 mm must be less than 10% of the initial mass.

Absence of adverse effects on the composting process, verified with a composting test on a pilot scale.

Low levels of heavy metals (below predefined maximum values) and absence of adverse effects on the quality of the compost (e.g., reduction of the agronomic value and presence of ecotoxicological effects on the growth of plants). A plant-growth test (test OECD 208, modified) is carried out on samples of compost where degradation of the test material has occurred. No difference must be highlighted as compared to a control compost.

Other chemico-physical parameters that must not change after degradation of the material being studied: pH; saline content; volatile solids; N; P; Mg; K.

It will be appreciated that a biodegradable material is not necessarily compostable because it must also disintegrate during a composting cycle. On the other hand, a material that breaks up during a composting cycle into microscopic pieces that are not then, however, totally biodegradable is not compostable.

UNI EN 13432 is a harmonized norm; i.e., it has been published in the Official Journal of the European Union and is adopted in Europe at a national level and envisages presumption of compliance with the European Directive No. 94/62 EC, on packages and package waste.

Following upon the increasing interest in the environment and in the end of life of everyday foodstuff waste, compostability is a requirement that is deemed increasingly important by consumers of the cartridges considered herein.

The inventors have moreover noted that the current technology of production of said products envisages that the two foils of filtering material are heat sealed together on the edge portions of the cartridge, using for this purpose a thermo-fusible material such as for example polyethylene, typically arranged as random fibres within the pure cellulose filtering matrix.

The presence of said non-compostable material (such as is polyethylene) may be localized also in areas of the cartridge where the heat-sealing polymer is not necessary, i.e., in the areas where the beverage flows.

This entails a use of the material in excess with respect to the real needs, with consequent increase in costs and higher negative impact on the environment.

The object of the present invention is to overcome the aforesaid drawbacks.

According to the invention, said object is achieved thanks to a cartridge having the characteristics recalled in Claim 1. Advantageous developments of the invention form the subject of the dependent claims.

The claims form an integral part of the technical teaching provided herein in relation to the invention.

In various embodiments a cartridge is proposed for preparing a liquid product, for example a beverage such as coffee, by introducing liquid and/or steam into the cartridge. The cartridge contains a dose of at least one substance, such as for example powdered coffee, which is able to form the aforesaid product using liquid and/or steam. The dose is enclosed between foils that can be traversed by the aforesaid liquid and/or steam, said foils being connected together around the dose.

The aforesaid foils are made of compostable material, i.e., material that can be recovered by composting and biodegradation, and are connected together around the dose by a material which is also compostable.

In various embodiments, the cartridge as a whole constitutes a packaging material that can be recovered by composting and biodegradation, for example in compliance with the norm UNI EN 13432:2002 and/or subsequent modifications and integrations.

BRIEF DESCRIPTION OF THE FIGURES

The invention will now be described, purely by way of non-limiting example, with reference to the annexed figures, wherein:

FIGS. 6 and 7 regard two respective embodiments.

DETAILED DESCRIPTION

Illustrated in the ensuing description are various specific details aimed at providing an in-depth understanding of the embodiments. The embodiments can be provided without one or more of the specific details, or with other methods, components materials, etc. In other cases, known structures, materials, or operations are not shown or described in detail so that the various aspects of the embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in various points of this description do not necessarily refer to one and the same embodiment. Moreover, particular conformations, structures, or characteristics can be combined in any adequate way in one or more embodiments.

The references used herein are provided merely for convenience and hence do not define the sphere of protection or the scope of the embodiments.

Figure 1:
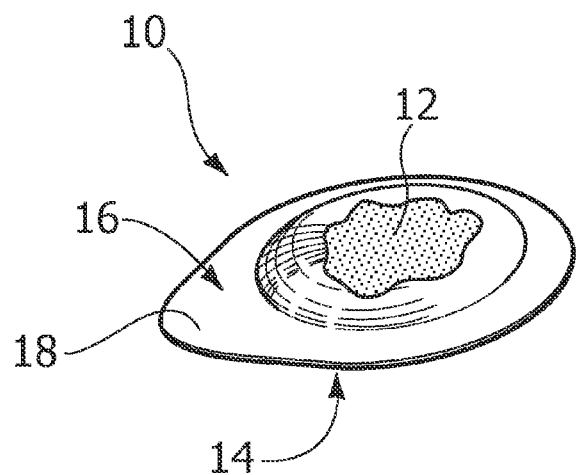
FIG. 1 is a general perspective view of a cartridge according to one embodiment.

In FIG. 1 the reference number 10 designates as a whole a cartridge for preparing a liquid produced by introducing liquid and/or steam into the cartridge.

In various embodiments, the liquid product in question can be constituted by a beverage such as coffee (for example, espresso coffee). In any case, the repeated reference, in the framework of the present detailed description, to the beverage coffee is in no way to be understood in a sense limiting the scope of the description, which is altogether general.

The cartridge 10 contains a dose 12 of at least one substance that is able to form the aforesaid product via the aforesaid liquid and/or steam.

In various embodiments, the dose 12 can be constituted by powdered coffee, or by another precursor of a liquid product such as, for example, a beverage, tea, chocolate either in powdered or granular form, products for preparing broths, soups, beverages, infusions of various nature, etc. Said list is be understood as purely having the nature of example and is in no way binding.

In various embodiments, the dose 12 can be enclosed between two foils 14, 16 that can be traversed by the liquid and/or steam used for preparing the liquid product. In various embodiments, the two foils 14 and 16 can be connected together around the dose 12, for example along a flange formed by the outer edges of the foils 14. Said flange may, for example, have an appendage 18 that extends like a tab with respect to the dose 12 so as to form a strip for getting hold of the cartridge 10 as a whole.

Said strip or tab, if present, can be used, for example:
for taking the cartridge out of a pack (for example, of the type known as "flow-pack"), in which the cartridge is inserted after packaging for the purposes of protection and preservation of the fragrance; and/or
for enabling insertion of the cartridge in the machine used for preparing the corresponding liquid product and for subsequent extraction of the cartridge from the aforesaid machine once the cartridge has been used for preparing the product.

The overall characteristics of a cartridge 10 as described so far, as well as the criteria and modalities of use of said cartridge are such as to be deemed known in the art and hence such as not to require any detailed description herein.

In particular, it will be appreciated that the possibility for the foils 14 and 16 to be traversed (at least in part of the area where the dose 12 is located) by the liquid and/or steam used for preparing the final product can derive both from the fact that the material constituting said foils in that area presents characteristics of intrinsic permeability (for example, given that it is a porous material) and from the fact that the material itself is subjected (according to known criteria) to perforation, for example with spikes that penetrate into said material.

Figure 2:
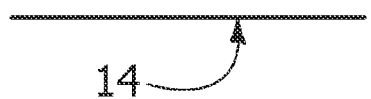
FIGS. 2 to 9 illustrate successive steps of a possible implementation of a method for providing the cartridge of FIG. 1.

In various embodiments, the production of a cartridge 10 as illustrated in FIG. 1 can start with the provision of a first foil designed to constitute the foil 14 (FIG. 2).

In various embodiments, this may be a foil made of porous material (i.e., permeable to a liquid and/or steam). In various embodiments, the foil 14 can be constituted by a foil, for example made of paper such as cellulose paper, or else by a nonwoven fabric, for example a cellulose-fibre-based fabric. In various embodiments, it may be a foil of paper that is 100% cellulose.

Further indications regarding materials that can be used for the foil 14 (and the foil 16: in various embodiments, the considerations made here regarding the nature and characteristics of the material constituting the foil 14 apply in fact in a practically identical way also to the foil 16) are provided in the sequel of the present detailed description.

Figure 3:
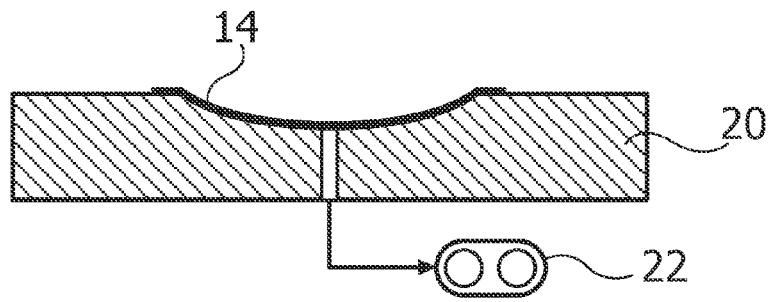
Figure 4:
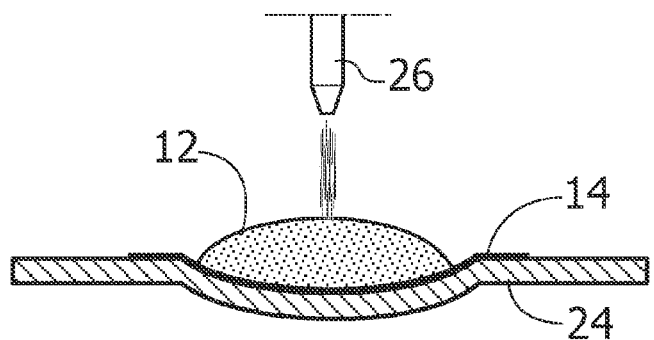

As may be inferred from the sequence of FIGS. 2 and 3, in various embodiments the foil 14 is arranged on a shaping/forming plate 20 having a general cuplike conformation. The plate 20 is able to co-operate with a source of subatmospheric pressure 22, such as, for example, a suction pump 22 (a so-called "vacuum pump"), capable of creating in the cuplike area of the plate 20 a subatmospheric level of pressure in such a way as to cause the foil 14 to assume itself a general cuplike conformation, with a central bowl-shaped part bordered by a plane peripheral flange.

It will be appreciated that such a conformation can be imparted on the foil 14 also by operating in a different way, for example, via an operation of mechanical shaping, i.e., resorting to a shaping plate that represents a convex conformation complementary to the cuplike conformation that is to be imparted on the foil 14.

It will moreover be noted that, whereas in the embodiments considered herein the dose 12, and hence the portions of the foils 14 and 16 that envelop it on opposite faces, have a general circular shape, said shape is not in any way imperative.

Once the cuplike conformation represented in FIG. 3 has been achieved (and after the possible transfer of the foil 14 onto a supporting plate 24, here presented as a distinct element but in various embodiments such as to coincide with the shaping plate 20), distributed in the bowl-shaped part of the foil 14 is a dose 12 of precursor of the liquid product.

In the embodiments considered herein (of course, without this being intended as in any way limiting the scope of the description) the dose in question is a dose 12 of powdered coffee delivered via a dispenser device 26 of a known type.

Figure 5:
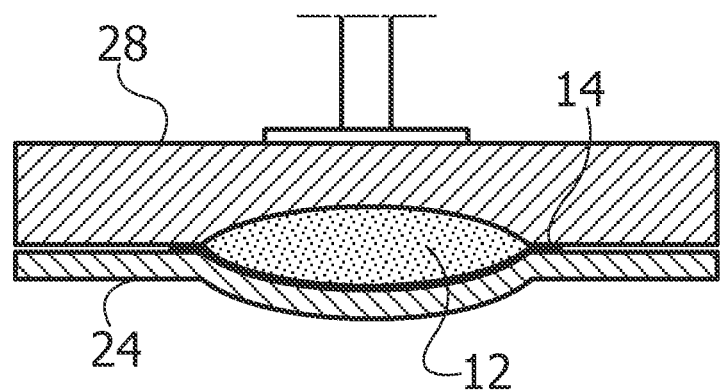

As illustrated schematically in FIG. 5, the dose (constituted, in the embodiments considered herein, by a material in powder form such as is powdered coffee) can be subjected to compacting, for example via a pressing punch 28, which is also of a known type.

Figure 6:
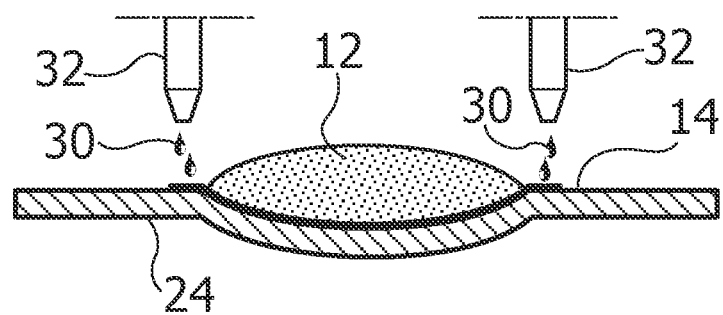
Figure 7:
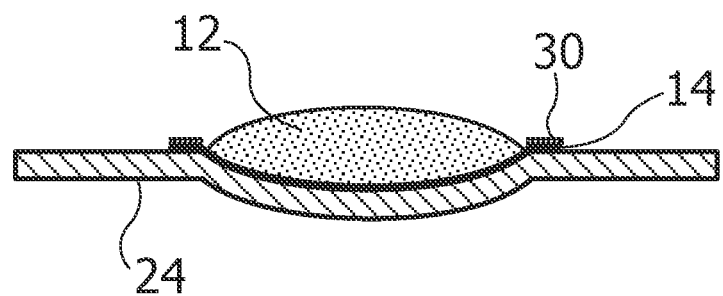

FIGS. 6 and 7 refer to embodiments aimed at providing the presence, on the outer flange of the foil 14, i.e., around the portion of the foil itself that surrounds the dose 12, of a connecting material 30, for example of an adhesive nature, which can be obtained according to various modalities, for example having the capacity of penetrating into the foils 14 and 16.

For example, in the embodiments referred to in FIG. 6, the material 30 is applied via nozzles 32 supplied, for instance, by a pumping structure for example with thrust plunger. In the embodiments referred to in FIG. 6, the material 30 can be applied on the top face of the peripheral flange of the foil 14 in spots.

In the embodiments referred to in FIG. 7, the material 30 is constituted by a ring of a flattened shape made (for example, via a dinking operation) starting from a foil or lamina constituted by the material 30.

The solutions illustrated in FIGS. 6 and 7 are suited to being used either as an alternative to one another or in combination. Further characteristics of the material 30 according to various embodiments will be given in what follows.

Figure 8:
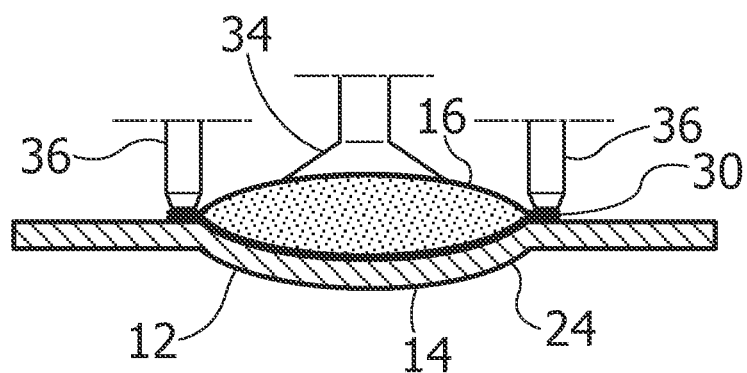
Figure 9:
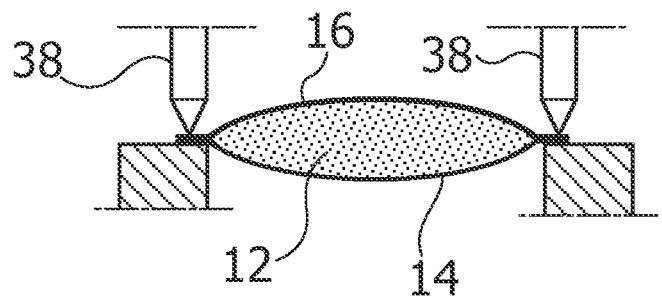

FIGS. 8 and 9 illustrate, instead, two further steps of embodiments of a method that enables a cartridge such as the cartridge 10 of FIG. 1 to be obtained.

FIG. 8 regards the operation that leads to applying a foil 16 over the dose 12, for example with a suction-pad applicator 34.

As has already been said, in various embodiments, the foil 16 (in a top position in the figures, hence designed to cover the dose 12 at the top and such that it can be connected to the foil 14 around the dose 12) can present characteristics substantially similar to those of the foil 14 (in a bottom position in the figures).

The foil 16 does not need to be preformed according to a general cuplike conformation (with concavity facing downwards), it being in fact sufficient to apply the foil 16 over the dose 12 to carry out a shaping operation of sorts of the foil 16 itself up against the dose 12. In this regard, it will be appreciated that also the operation of shaping of the bottom foil 14 described with reference to FIG. 3 is not in itself imperative in so far as the foil can assume a bowl-like conformation even simply as a result of deposition of the dose 12 thereon.

Once again it will be recalled that the general circular conformation of the dose 12 constitutes just one possible choice of embodiment; the shape of the dose 12 itself can be any, given the possibility of the foils 14 and 16 to adapt easily to doses 12 of different shapes.

FIG. 8 shows that the top foil 16 can be rendered fixed with respect to the foil 14 by performing the action of connection of the respective peripheral facing flanges using the material 30.

It will on the other hand be appreciated that, even though the connection of the foils 14 and 16 around dose 12 can be achieved via supply of heat (or possibly, via supply of ultrasound energy), it can be obtained in general as a result of an operation where the filtering fibres of the two foils 14 and 16 penetrate into one another, i.e., with the material 30 that connects the peripheral edges of the said foils 14 and 16 together.

The operation (or sequence of operations) that leads the peripheral edges of the foils 14 and 16 to be set on top of one another and then be connected together causes the material 30, when deposited in the form of spots or drops (as schematically illustrated in FIG. 6), to be spread on the surface of facing edges of the foils 14 and 16 giving rise to a continuous formation. The fact that said continuous formation derives from the spreading of drops or spots of material originally deposited as distinct formations can in any case be easily detected also through inspection of the cartridge 10 once it is finished. According to similar modalities, it is also possible to detect the fact that the material 30 has been originally applied in the form of an annular body as illustrated in FIG. 7.

Finally, FIG. 9 shows how the cartridge 10 comprising the dose 12 enclosed between the two foils 14 and 16 connected together with the connecting material 30 can be subjected to a dinking operation using dinking tools 38, which are also of a known type, so as to bestow on the cartridge a desired peripheral border, such as, for example, the border that may be appreciated from FIG. 1.

The foregoing description highlights how, in various embodiments, the two foils 14 and 16 connected together around the dose 12 can be made of compostable material in the terms discussed in the introductory part of the present description.

In various embodiments, the material of the foils 14 and 16 is a porous material, intrinsically susceptible to being traversed by the liquid (possibly under pressure and/or at high temperature, i.e., hot) and/or by the steam used to form the final liquid product using the dose 12, without any need for it to be perforated.

In various embodiments, said material can be constituted by:
- polymers extracted from biomass (e.g., polysaccharides such as starch—Mater-Bi®—cellulose, lipids, proteins);
- synthetic polymers (e.g., polylactic acid—PLA—derived from fermentation of starch);
- polymers produced by genetically modified micro-organisms or bacteria (e.g., polyhydroxyalckanoates—PHAs);
- polymers from fossil monomers (e.g., polybutylsuccinate—PBS);
- mixtures of the above (the so-called "compounds") with or without the introduction of additives, such as nanoparticles (e.g., talc, cloesite);
- cellulose or cellulose paper, cardboard, cellophane, cellulose acetate.

In various embodiments, the two foils 14 and 16 are connected together around the dose 12 using a connecting material 30, which is also compostable in the terms discussed in the introductory part of the present description.

Since the material of the dose 12 can be basically a material of a foodstuff type, such as can be used for preparing a beverage such as coffee, tea, broth, soups, etc., the entire cartridge 10 of FIG. 1 can be qualified as a compostable package, i.e., a packaging that can be recovered by composting and biodegradation.

In various embodiments, the material 30 can be a thermo-fusible material, for example, a material such as to become fluid or semifluid at a temperature higher than 70° C. In various embodiments, as connecting material 30 it is possible to use a base material of:
- polymers extracted from biomass (e.g., polysaccharides such as starch—Mater-Bi®—cellulose, lipids, proteins);
- synthetic polymers (e.g., polylactic acid—PLA—derived from fermentation of starch);
- polymers produced by genetically modified micro-organisms or bacteria (e.g., polyhydroxyalckanoates—PHAs);
- polymers from fossil monomers (e.g., polybutylsuccinate—PBS);
- mixtures of the above (the so-called "compounds");
- cellulose or cellulose paste;
- biodegradable polyesters, such as for example polycaprolactone (PCL), used also with addition of proteins.

As has already been said, in various embodiments, the material 30 can be applied via deposition, on at least one of the foils 14, 16, of a ring of spots subsequently spread out when the two foils 14, 16 are coupled together (FIG. 9). In various embodiments (FIG. 7), the material 30 can be a body of an annular shape set between the two foils 14 and 16.

In various embodiments, the presence of the material 30 can hence be limited just to the area where the foils 14 and 16 are solidified together. It follows that, in various embodiments, at least one of the foils 14, 16—and preferably both of said foils—can present the portion (which is bowl-shaped, in the embodiments considered herein) extending in the region corresponding to the dose 12 that is completely free, or at least substantially free, from the material 30. In other words, in at least one, and preferably in both, of the foils 14, 16 the respective portion that extends in the region corresponding to the dose 12 can be for the most part of its extension without the presence of the material 30.

From this solution there derives the possibility of optimizing the use of the material 30 (which is such as to constitute a high-quality material and hence quite costly) limiting its use to just the areas in which the latter is designed to perform an effective function, unlike the traditional case, where the heat-sealing material is arranged over the entire surface of the cartridge.

In various embodiments, the compostable connecting material 30 can be chosen in such a way as to have a melting temperature that is very different from that of the two foils 14 and 16 in order to prevent problems of plastic deformation of the connecting edge portion and at the same time possess a good chemical affinity with the materials that constitute the aforesaid foils 14 and 16. The resulting overall action of connection is both of a mechanical type as a result of a penetration of said material 30 into the two porous foils and of a chemical nature.

Of course, without prejudice to the principle of the invention, the details of construction and the embodiments may vary, even significantly, with respect to what has been illustrated herein purely by way of non-limiting example, without thereby departing from the scope of the invention as defined by the annexed claims.

The invention claimed is:

1. A cartridge for preparing a liquid product by means of liquid and/or steam introduced into the cartridge, the cartridge comprises:
   a filling,
   two foils,
   wherein the filling contains at least one substance for preparing said product by means of said liquid and/or steam included between the two foils to be traversed by said liquid and/or steam, said two foils being mutually connected around said filling, wherein:
   the two foils are of a compostable material, and
   the two foils are mutually connected around said filling by means of a connection material which is compostable,
   wherein the connection material is a thermo-fusible material that is adapted to pass to a fluid state or a semi-fluid state upon reaching a given softening temperature,
   wherein the two foils are made of a porous material, which has a porosity,
   wherein the connection material penetrates the porosity of the two foils' porous material,
   wherein the connection material has a melting point, and the two foils have a melting point that is different than the melting point of the connection material.

2. The cartridge of claim 1, wherein at least one of the two foils includes a portion extending in a region of the filling, and wherein a portion of the portion of the foil that extends in the region of the filling does not contain any connection material.

3. The cartridge of claim 1, wherein the two foils include a compostable material selected from the group consisting of: polymers derived from biomasses; synthetic polymers; polymers produced by micro-organisms or genetically modified bacteria; polymers from fossil monomers; mixtures of said polymers, with or without additives; cellulose or cellulose paper; cardboard; cellophane; cellulose acetate.

4. The cartridge of claim 1, wherein the two foils are at least partly comprised of a non-woven tissue.

5. The cartridge of claim 1, wherein said connection material includes a compostable material selected from the group consisting of: polymers derived from biomasses; synthetic polymers; polymers produced by micro-organisms or genetically modified bacteria; polymers from fossil monomers; mixtures of said polymers; cellulose or cellulose paste; biodegradable polyesters, with proteins as possible additives.

6. The cartridge of claim 1, wherein said connection material is a material deposited in the form of drops around said filling on at least one of the two foils and subsequently spread around said filling.

7. The cartridge of claim 1, wherein said connection material is applied in the form of an annular body interposed between the two foils.

8. The cartridge of claim 1, wherein said connection material connects the two foils continuously around said filling.

* * * * *